(12) United States Patent
Hao et al.

(10) Patent No.: US 12,517,745 B2
(45) Date of Patent: Jan. 6, 2026

(54) LOG LEVEL MANAGEMENT PORTAL FOR VIRTUAL DESKTOP INFRASTRUCTURE (VDI) COMPONENTS

(71) Applicant: Omnissa, LLC, Mountain View, CA (US)

(72) Inventors: Yue Hao, Beijing (CN); Bo Liu, Beijing (CN); Feng Yan, Beijing (CN); Anish Lodha, Bengaluru (IN); Paul Andrew Green, London (GB); Philip Donald Lee, London (GB)

(73) Assignee: Omnissa, LLC, Mountain View, CA (US)

( * ) Notice: Subject to any disclaimer, the term of this patent is extended or adjusted under 35 U.S.C. 154(b) by 652 days.

(21) Appl. No.: 17/934,313

(22) Filed: Sep. 22, 2022

(65) Prior Publication Data

US 2023/0418638 A1    Dec. 28, 2023

(30) Foreign Application Priority Data

Jun. 28, 2022    (WO) ................. PCT/CN2022/101926

(51) Int. Cl.
*G06F 9/455* (2018.01)
*G06F 11/07* (2006.01)

(52) U.S. Cl.
CPC ...... *G06F 9/45533* (2013.01); *G06F 11/0778* (2013.01)

(58) Field of Classification Search
CPC ....... H04L 63/00; H04L 67/10; H04L 67/104; H04L 67/1095; G06F 9/546; G06F 21/64; G06Q 50/26
See application file for complete search history.

(56) References Cited

U.S. PATENT DOCUMENTS

| | | | | |
|---|---|---|---|---|
| 2009/0077412 A1* | 3/2009 | Langford | ............ | G06F 11/2038 714/4.1 |
| 2013/0054680 A1* | 2/2013 | Nakano | ............... | G06F 11/3476 709/203 |
| 2014/0007119 A1* | 1/2014 | Liu | ......................... | G06F 9/466 718/102 |
| 2014/0067886 A1* | 3/2014 | Sakanashi | ............. | G06F 11/366 707/825 |

(Continued)

OTHER PUBLICATIONS

Bosch et al. "The LSST Science Pipelines Software: Optical Survey Pipeline Reduction and Analysis Environment" LSST May 2025 pp. 1-28.*

*Primary Examiner* — Charles E Anya
(74) *Attorney, Agent, or Firm* — Kim & Stewart LLP

(57) ABSTRACT

The disclosure provides a method of log level setting at a first component in a remote computing environment. The method generally includes receiving a requested log level for one or more requested features, wherein the one or more requested features comprise a subset of features of the first component, obtaining a configuration file for the one or more requested features, parsing the configuration file obtained for the one or more requested features to create a log level dependency map, and setting a log level for one or more of the features of the first component based on the requested log level and the log level dependency map, wherein setting the log level comprises setting the log level for at least the one or more requested features.

15 Claims, 7 Drawing Sheets

(56) References Cited

U.S. PATENT DOCUMENTS

| | | | |
|---|---|---|---|
| 2014/0149576 A1* | 5/2014 | Pavlov | G06F 11/302 709/224 |
| 2015/0095488 A1* | 4/2015 | Sutou | G06F 11/3409 709/224 |
| 2015/0143182 A1* | 5/2015 | Rajamanickam | G06F 11/0781 714/48 |
| 2018/0004623 A1* | 1/2018 | Krishnamoorthy | G06F 11/3495 |
| 2018/0060211 A1* | 3/2018 | Allen | G06F 11/3698 |
| 2020/0192778 A1* | 6/2020 | Gao | G06F 11/3476 |
| 2020/0394167 A1* | 12/2020 | Garvey | G06F 12/0815 |

* cited by examiner

CHANGE LOG LEVELS WARNING

The log level for Feature A will change to ☐

Log levels will also be updated for the following Features assocated with Feature A:

- [X] Feature M
- [X] Feature N
- [X] Feature O
- [X] Feature P
- [X] Feature Q

LOG LEVEL MANAGEMENT PORTAL FOR VIRTUAL DESKTOP INFRASTRUCTURE (VDI) COMPONENTS

CROSS-REFERENCE TO RELATED APPLICATIONS

This application claims priority to International Patent Application No. PCT/CN2022/101926, filed Jun. 28, 2022, entitled "LOG LEVEL MANAGEMENT PORTAL FOR VIRTUAL DESKTOP INFRASTRUCTURE (VDI) COMPONENTS", and assigned to the assignee hereof, the contents of which are hereby incorporated by reference in its entirety.

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running. These events may trigger different features running on this virtual desktop or other components within the VDI environment.

In particular, the VDI environment may contain many different components distributed across one or more client devices and/or remote devices in the environment. For example, components in the VDI environment may include one or more VDI clients which are applications installed on client devices that communicate with a connection server to establish connections with remote virtual or physical desktops or remote applications, one or more VDI agents which are software components installed on remote virtual or physical desktops and are configured to communicate with the one or more VDI clients, and a connection server that authenticates users of client devices, provides single sign-on, associates remote virtual or physical desktops or remote applications with VDI clients, etc.

Further, each of these components may include one or more features (e.g., remote experience features). Examples of such features may include a remote display protocol feature designed to deliver graphics-intensive virtual workloads, a client drive redirection (CDR) feature for redirecting a local or network drive from a client device to a virtual desktop or application, a drag and drop feature which provides functionality to easily move files, directories, email attachments, text, images, and the like between a host server hosting the virtual machine (VMs) and the client device, a deep packet inspection (DPI) synchronization feature used to confirm whether a DPI setting in a virtual desktop matches a client device's DPI setting, a universal serial bus (USB) passthrough feature which allows a user to connect a physical USB device attached to a USB port of a host to a VM as if the USB device was connected to the VM directly, and/or the like.

Each component, having one or more features, may record operational information in individual log files dedicated to that component. A log file is a computer-generated data file that contains information about usage patterns, activities, and/or operations within each component. When an event occurs within a component (or within a feature of that component), the logging function creates a log and adds it to a log file for the corresponding component. Each logged event may be assigned a log level which describes the type and severity of the logged event.

An amount of detail about the behavior of a component or a feature that is collected in each log file may be based on one or more configured log levels for the log file associated with that component or feature. Example log levels may include TRACE, DEBUG, INFO, and VERBOSE log levels. In particular, a TRACE log level may be configured where all details about the behavior of a component or a feature are desired, while a DEBUG log level may be configured to capture less information, such as, only information needed to diagnose, troubleshoot, or test the component or feature. An INFO log level may designate normal behavior. In particular, an INFO log level may be the standard log level indicating that something happened, a component or feature entered a certain state, etc. The information logged using the INFO log may be informative, and may not necessarily require any follow up. Lastly, a VERBOSE log level may be configured to provide a record of almost every detail of a component or feature.

Log files contain a wealth of information about one or more events associated with (e.g., that take place within) a component or feature. An amount of detail about the behavior of a component or a feature that is collected in each log file may be based on one or more configured log levels for the log file associated with that component or feature. In particular, a log level may be set in a logging framework to limit a type (and/or amount) of logged events which are collected in a log file for a particular component or feature. For example, a log level for a logging framework associated with a particular feature may be set to a DEBUG log level thereby causing the collection of only logged events with a DEBUG log level occurring on that feature. Different log levels may be considered to ease information search, alerting, and/or filtering when handling large log files for purposes of troubleshooting, creating alerts, searching for issues, and/or performing regular checks on one or more components or features in the VDI environment.

Specifically, in some cases, log files may be analyzed for troubleshooting issues identified at a client device in the VDI environment. Troubleshooting is a systematic approach to problem-solving that may be used to find and correct issues with components and/or features in the environment. For example, a VDI administrator may initiate the collection of logs that are assigned a particular log level, analyze the collected logs, and ascertain a root cause of an issue identified at a client device based on such analysis.

In some cases, logs may be collected at the component level, instead of the feature level. In such cases, where a fault occurs with respect to a particular feature (e.g., the USB passthrough feature), the VDI administrator may not be able to collect only logs for that particular feature (e.g., only logs associated with the USB passthrough feature), nor configure a log level for the particular feature, as the log level may be set on a per-component basis. Instead, to troubleshoot the issue identified for the particular feature, logs may be collected for the component associated with the identified feature at a log level set for the component.

The returned logs may include information about all of the events (e.g., that are assigned the particular log level) that take place for each feature of the component, including the particular feature to be analyzed. For example, where a component includes a remote display protocol feature, a CDR feature, and a USB passthrough feature, logs collected for the component may include logs corresponding to events associated with each of these three features. Collecting and returning logs for each of these three features may result in greater reporting latency, as well as an increased use of available resources (as opposed to only returning a log for the particular feature), thereby impacting overall performance.

Further, information provided in the logs may not provide sufficient granularity to allow a VDI administrator to identify a root cause of a particular feature's fault. For example, in some cases, more than one feature of the component for which the logs are returned may be experiencing a fault; thus, the returned logs may identify multiple issues. A VDI administrator seeking to determine a root cause of a particular issue for a particular feature may not be able to successfully sift through the returned logs, which identify multiple issues, to pinpoint a root cause for only one issue needing to be corrected. The surplus of information provided to the VDI administrator may obfuscate an underlying root cause of the particular issue to be solved.

In some cases, a log level for one component or feature may be dependent on log levels for other components and/or features. Thus, setting the log level prior to collection of logs for the component or feature may adversely impact performance of the system. For example, the system may not be aware of which components/features are dependent on other components/features. Further, even where the system is aware, changing the log level for multiple components/features (e.g., especially in cases where a log level is to be set for an entire component when only one feature of the component is desired to be analyzed) may negatively impact processing times and/or resource availability.

It should be noted that the information included in the Background section herein is simply meant to provide a reference for the discussion of certain embodiments in the Detailed Description. None of the information included in this Background should be considered as an admission of prior art.

SUMMARY

A method of log level setting at a first component in a remote computing environment is provided. The method includes: receiving a requested log level for one or more requested features, wherein the one or more requested features comprise a subset of features of the first component; obtaining a configuration file for the one or more requested features; parsing the configuration file obtained for the one or more requested features to create a log level dependency map, wherein the log level dependency map identifies whether associations between the one or more requested features and one or more other features of the first component exist; and setting a log level for one or more of the features of the first component based on the requested log level and the log level dependency map, wherein setting the log level comprises setting the log level for at least the one or more requested features.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

FIG. 4 depicts an example UI indicating the impact a change in one remote experience feature's log level has on other remote experience features in the VDI environment, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
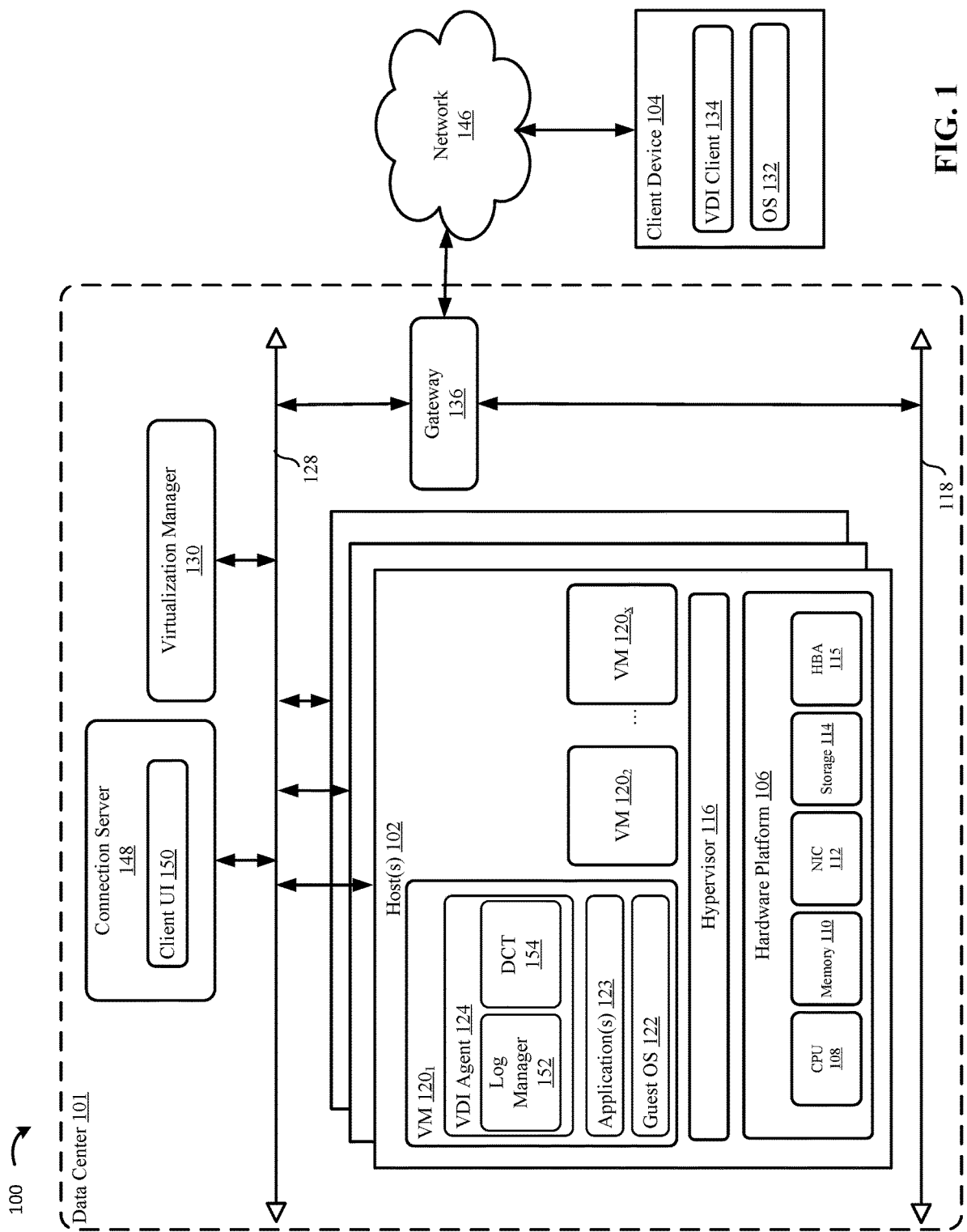
FIG. 1 depicts a block diagram of a virtualized desktop infrastructure (VDI) environment in which one or more embodiments of the present disclosure may be implemented.

The present disclosure provides an approach for enhanced log collection, such as in a remote computing environment. Though certain aspects are described with respect to a remote computing environment, or remote computing/experience features, the techniques described herein may similarly be used with any suitable components/features of any suitable computing environment. Data logging, e.g., the process of collecting and storing data over a period of time in order to analyze specific trends or record data-based events/actions of components in an environment, is an important aspect of software development. In certain aspects, log management systems provide a solution for log collection, analysis, and reporting. In some cases, log management systems may need to be capable of providing quick and easy access to logs for the manipulation of one or more log settings (e.g., log level settings) prior to log collection. In some cases, log management systems may provide a level of log granularity for troubleshooting overall system performance and/or performance of one or more components (or features) which make up the overall system.

Accordingly, aspects of the present disclosure provide a centralized log management system for log collection. The centralized log management system described herein may be provided as a portal for users to query logs, manipulate log level settings, and/or collect logs for analysis in a computing environment, such as a virtual desktop infrastructure (VDI) environment. The portal may be provided as a user interface (UI) to allow a user to perform such actions with respect to one or more components and/or features, such as remote experience features in the VDI environment. Though certain aspects are described herein with respect to a VDI environment, the techniques herein may be applied to other suitable environments and their components/features.

As mentioned, the VDI environment may contain many different components (e.g., client VDIs, agent VDIs, connection server, etc.) distributed across one or more client devices and/or remote devices. Further, each component may include one or more remote experience features to allow for remote client experience when a client's device is connected to a virtual desktop. As used herein, a "virtual desktop" (or "remote desktop") is a desktop running on, for example, a virtual machine (VM) that is displayed remotely on the client's device (e.g., phone, laptop, tablet, etc.), as though the remote desktop were running on the client's device.

According to aspects described herein, each component and/or feature may have an associated configuration file. In certain aspects, a configuration file uses a JSON format. The configuration file defines the log level settings for each corresponding component or feature. In particular, the configuration file may normalize each component and/or feature's supported log level(s) to one or more defined log levels. In certain aspects, the one or more defined log levels include an INFO log level, a DEBUG log level, a TRACE log level, and a VERBOSE log level. As an illustrative example, a feature may support two log levels, and a configuration file associated with the feature may map each of the defined log levels for the computing system to the supported log levels for the component (e.g., where there are four defined log levels, the configuration file maps each of four defined log levels to a supported log level of the feature). In other words, the configuration file for each component and/or feature may contain key-value mappings, each mapping being between (a) the key, which is a defined log level for the environment and (b) the value, which is a supported log level of the corresponding feature or component.

As described in more detail below, maintaining such key-value mappings in each component and/or feature's configuration file may allow a user to more efficiently set a log level for multiple components and/or features in the environment supporting different log levels. For example, a user may request to set the log level for five different components (e.g., each supporting different log levels) to a first defined log level for the environment. Accordingly, the first defined log level may be used as a key to set the log level for each of the five components. In particular, the key may be used to return a value that is mapped to that key in each of the five configuration files corresponding to each of the five features, the value indicating a supported log level that is to be set for the corresponding component or feature.

In certain aspects, a user may use the log level management portal (e.g., the UI) to query log levels per feature or component. For example, the user may select one or more features via the UI for which logs are requested. The request may be transmitted to one or more software components (e.g., VDI agents or clients) including the requested features in the VDI environment. Data collection tool (DCT) scripts may be installed on each software component to allow for the collection of logs and/or configuration files per requested feature (or component, in other examples). Accordingly, each software component receiving the request, may service the request by collecting configuration files associated with one or more of the selected features. In some cases, an algorithm may be used to parse each selected feature's configuration file to determine a log level and associated features for each selected feature. Associated features returned for a selected feature may indicate other features in the VDI environment which share the same log level setting as the selected feature. Such information (e.g., log level and associated features) determined for each of the selected features may be returned to the user via the UI.

In certain aspects, a user uses the UI to set log levels per feature or component. In some cases, the user selects a single log level for one or more features (or components). In some cases, the user selects different log levels for each feature (or component) to be set. In certain aspects, the log level selection per feature is transmitted to one or more software components in the VDI environment. In certain aspects, DCT scripts at each of these software components service the request by collecting configuration files associated with one or more of the identified features for which a log level is to be set, parses each selected feature's configuration file to determine associated features for each identified feature. In cases where a feature does not have any associated features, the log level requested for the feature may be set. In cases where a feature does have associated feature(s), the log level requested for the feature may be set, and similarly, the requested log level may also be set for each of the associated features. In certain aspects, a warning message is returned to the user to inform the user that changing a log level for a feature having associated features also causes the log levels for the associated features to change.

In certain aspects, a user uses the UI to collect log levels per feature or component. In some cases, the user selects one or multiple components having one or more features for which logs are to be collected. In some cases, the user selects one or multiple features for which logs are to be collected. In some cases, the user selects a mixture of components and features for which logs are to be collected. An indication of the selected components and/or features may be transmitted to one or more software components in the VDI environment. DCT scripts at each of these software components may service the request by collecting logs for the selected components and/or features, which may be returned to the user.

In certain aspects, the techniques described herein provide a comprehensive approach to log management that uses a centralized UI to manipulate log settings and/or collect logs from across a VDI environment. In certain aspects, as a result of implementing a centralized UI, as well as creating configuration files for each component and/or feature to provide uniform log levels across the VDI environment, more user-friendly and efficient functionality is provided to allow a user to query log settings (e.g., log levels), manipulate log settings, and/or collect logs for one or more components and/or features. For example, collecting logs for multiple components and/or features in the VDI environment may be accomplished via the centralized UI.

Further, the techniques described herein provide a greater level of granularity to more accurately troubleshoot identified issues. For example, where an issue is identified for a particular feature, instead of collecting logs for a component in the VDI environment (e.g., including the particular feature as well as one or more other features), only a log specific to the feature can be collected (e.g., allows for the collection of logs per feature). As a result, a user may be able to more efficiently identify an underlying root cause of the issue, and in some cases, with additional accuracy (e.g., given only issues for the feature are present in the returned log, as opposed to a mixture of issues which may be present across multiple features).

In certain aspects, the techniques described herein also help to identify associated features and/or components such that when a log level for a particular feature and/or component is to be set/changed, associated features and/or components are similarly changed to maintain the integrity of logging mechanisms in the VDI environment.

Though aspects herein are described with respect to logs in log files, the techniques described herein may be similarly applied to dump files. A dump file is a computer-generated file that contains the complete state of a component and/or feature at the time it was captured. A dump file may contain information regarding, but not limited to, memory, stack traces, thread information, and/or feature/component information. A dump file is often generated prior to a crash, but may be taken at any point. A dump file may be used for various purposes including, for example, for critical troubleshooting, debugging crashed components/features, and/or finding memory leaks.

The centralized UI described herein may also be used as a portal for users to query dump files (in addition to, or as an alternative to, logs) per feature or component. For example, a user may select one or more features via the UI for which dump files are requested. The request may be transmitted to one or more software components (e.g., VDI agents or clients) including the requested features in the VDI environment. Each software component receiving the request, may service the request by collecting dump files associated with one or more of the selected features. The configuration files for the requested feature(s) may be configured to allow for such dump file collection per feature.

Further, in certain aspects, the centralized UI may allow for real-time dumps. A real-time dump (or live dump) may be used to gather data to troubleshoot an abnormal situation at a component and/or feature, but allow the component and/or feature to continue operation. In certain aspects, DCT scripts at each component may support real-time dumps for a particular component and/or feature at each component to support the diagnosis of issues occurring on the particular component and/or feature.

FIG. 1 depicts a block diagram of a VDI environment 100 in which one or more embodiments of the present disclosure may be implemented. VDI environment 100 comprises a client device 104 and a data center 101, connected by a network 146. Network 146 may be, for example, a direct link, a local area network (LAN), a wide area network (WAN) such as the Internet, another type of network, or any combination thereof.

Client device 104 is a physical device, such as a general purpose desktop computer or mobile computer. A mobile computer may be, for example, a laptop, a mobile phone, or a tablet computer. Client device 104 includes VDI client 134 and operating system (OS) 132. In certain embodiments, VDI client 134 runs on top of OS 132. OS 132 may be a standard, commodity operating system.

VDI client 134 is a user-side interface of a virtualized desktop running on one of VMs 120. Though certain aspects are described herein with respect to a virtual desktop running on a VM, the techniques may similarly be used for a virtual desktop or application running on other types of VCIs, such as containers, or on physical computing devices.

By opening VDI client 134, a user of client device 104 accesses, through network 146, a remote desktop running in remote data center 101, from any location, using client device 104. Frames of the remote desktop running on VM 120 are transmitted to VDI client 134 using a remote display protocol such as VMware® Blast™, or Microsoft® Remote Desktop Protocol (RDP)™. After transmission, the frames are displayed on client device 104 for interaction by a user. Client device 104 sends user inputs to VM 120 for processing on VM 120 of data center 101, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others. As the user interacts with the virtual desktop, such as using a mouse and keyboard, the user input is redirected by VDI client 134 to a VDI agent 124.

Data center 101 includes host(s) 102, a virtualization manager 130, a connection server 148, a gateway 136, a management network 128, and a data network 118. Although the management and data network are shown as separate physical networks, in some implementations the management network is logically isolated from the data network using different VLAN identifiers. Each of hosts 102 may be constructed on a server grade hardware platform 106, such as an x86 architecture platform. For example, hosts 102 may be geographically co-located servers on the same rack.

Host 102 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host 102. Hypervisor 116 may run on top of the OS in host 102. In some embodiments, hypervisor 116 can be installed as system level software directly on hardware platform 106 of host 102 (often referred to as "bare metal" installation) and be conceptually interposed between the physical hardware and the guest OS s executing in VMs 120. In some implementations, hypervisor 116 may comprise system level software as well as a "Domain 0" or "Root Partition" VM, which is a privileged machine that has access to the physical hardware resources of host 102. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123 and a VDI agent 124. Application(s) 123 and VDI agent 124 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. As described in more detail below, such authentication may be performed by a connection server 148. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

In certain aspects, each VDI agent 124 may include a log manager 152 and a DCT 154. DCT 154 may comprise DCT scripts which are installed on each VDI agent 124 to enable the collection or manipulation of configuration files (e.g., change/set the log level) and/or logs for the corresponding VDI agent 124, or one or more features on the VDI agent 124. In particular, log manager 152 may receive a request (e.g., from a connection server 148, as described in more detail below) for the collection or manipulation of log settings for one or more features on VDI agent 124 or receive a request to collect logs for one or more features on VDI agent 124. In response to receiving the request, log manager 152 may invoke DCT 154 to perform the requested collection and/or manipulation. In some cases, DCT 154 is used to collect a configuration file for VDI agent 124 and/or collect configuration files for one or more features on VDI agent 124. In some cases, DCT 154 is used to collect logs for VDI agent 124 and/or collect logs for one or more features on VDI agent 124. In some cases, DCT 154 is used to set a log level for VDI agent 124 and/or set log levels for one or more features on VDI agent 124. Though DCT 154 is illustrated only on one VDI agent 124 in FIG. 1, in certain aspects, DCT 154 may be installed on multiple (e.g., all) VDI agents 124 and multiple (e.g., all) VDI clients 134.

Hardware platform 106 of each host 102 includes components of a computing device such as one or more processors (CPUs) 108, memory 110, a network interface card including one or more network adapters, also referred to as Network Interface Cards (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 102 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 102 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 102 via a network, shown as management network 128, and carries out administrative tasks for data center 101 such as managing hosts 102, managing VMs 120 running within each host 102, provisioning VMs, migrating VMs from one host to another host, and load balancing between hosts 102. Virtualization manager 130 may be a computer program that resides and executes in a central server in data center 101 or, alternatively, virtualization manager 130 may run as a virtual appliance (e.g., a VM 120) in one of hosts 102. One example of a virtualization manager is the vCenter Server™ product made available from VMware, Inc. of Palo Alto, California.

Connection server 148 is a software service which acts as a broker for client device 104 connection. In particular, connection server 148 authenticates users of client device 104 and directs requests for connection from client device 104 (e.g., from VDI client 134) to an appropriate VM 120 (e.g., particular VDI agent 124) in data center 101. Beyond authentication, connection server 148 may provide the following management capabilities: (1) manage remote desktop and application sessions, (2) establish a secure connection between client device 104 and remote desktops and application (e.g., between VDI client 134 and VDI agent 124), (3) enable a single sign-on, and/or (4) set and apply policies.

In certain aspects, connection server 148 includes a client UI 150. Client UI 150 may be the point at which a user may interact with the VDI environment. For example, a user may use client UI 150 to request the querying of one or more logs, the manipulation of one or more log level settings, and/or the collection of one or more logs for one or more components and/or features in the VDI environment. As described above, a request from a user using client UI 150 may be transferred to different components (e.g., VDI agents 124 and/or VDI clients 134) having DCT 154 installed thereon to service the request.

Gateway 136 provides VMs 120 and other components in data center 101 with connectivity to network 146. Gateway 136 may manage external public internet protocol (IP) addresses for VMs 120, route traffic incoming to and outgoing from data center 101, and provide networking services, such as firewalls, network address translation (NAT), dynamic host configuration protocol (DHCP), and load balancing. Gateway 136 uses data network 118 to transmit data network packets to hosts 102. Gateway 136 may be a VCI, a physical device, or a software module running within host 102. Gateway 136 may include two gateways: a management gateway for management network 128 and a data gateway for data network 118.

Figure 2:
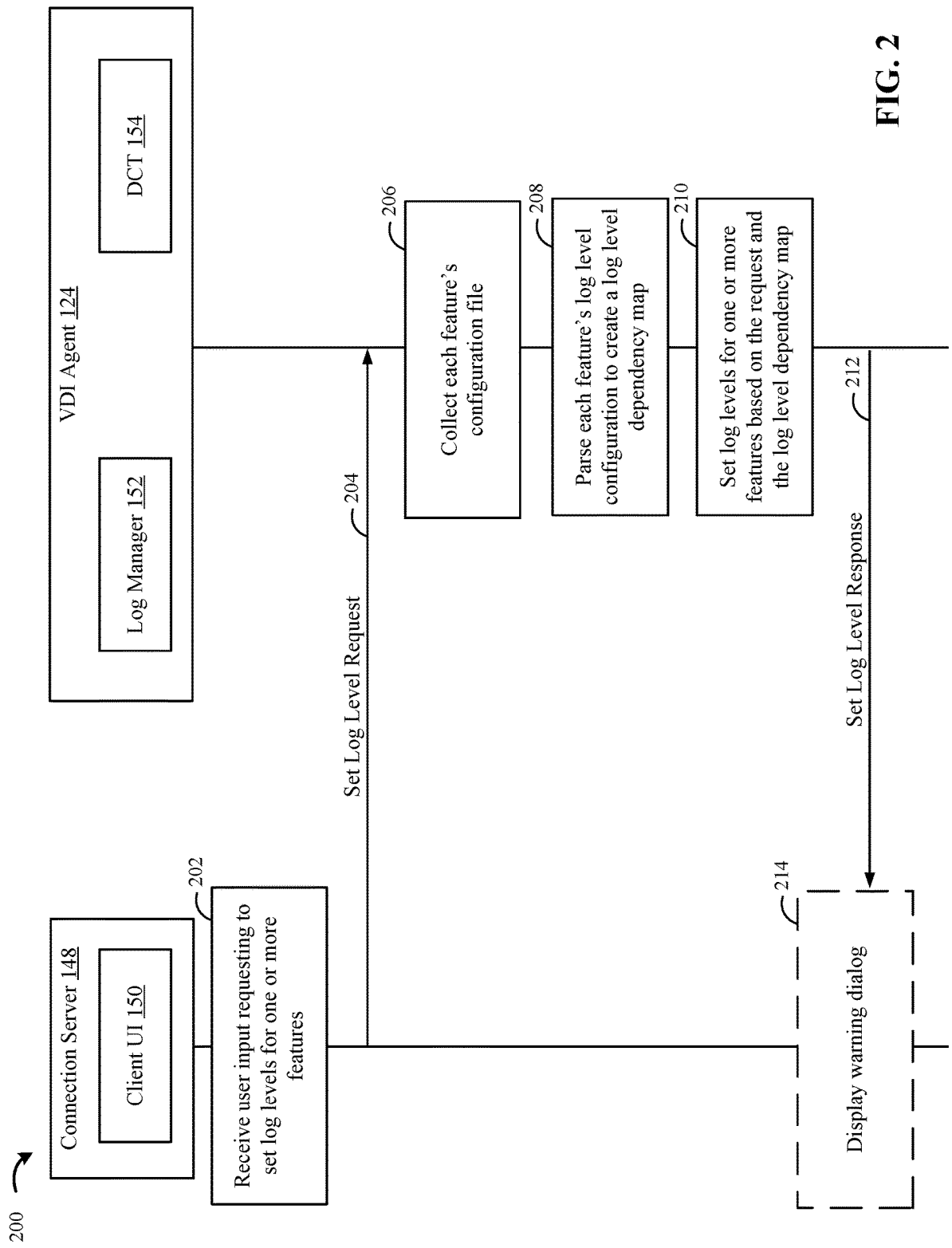
FIG. 2 is a call flow diagram illustrating example operations for setting log levels for one or more remote experience features in the VDI environment, according to an example embodiment of the present disclosure.

FIG. 2 is a call flow diagram illustrating example operations 200 for setting log levels for one or more features in the VDI environment, according to an example embodiment of the present disclosure. As shown, operations 200 illustrated in FIG. 2 may be performed by connection server 148, including client UI 150, and VDI agent 124, including log manager 152 and DCT 154, to set log levels for one or more features, and more specifically, at least one feature on the illustrated VDI agent 124. Though FIG. 2 illustrates setting log levels for one or more features, similar operations illustrated in FIG. 2 may also be used to set log levels for one or more components in the VDI environment.

Operations 200 begin by a user (e.g., an administrator, a person seeking to troubleshoot one or more issues, a developer, etc.) accessing client UI 150, provided by connection server 148, to set log levels for one or more features. Accordingly, at operation 202, client UI 150 receives user input requesting to set log levels for one or more features selected by the user. Log levels may be set for features on one or more components in the VDI environment.

Figure 3:
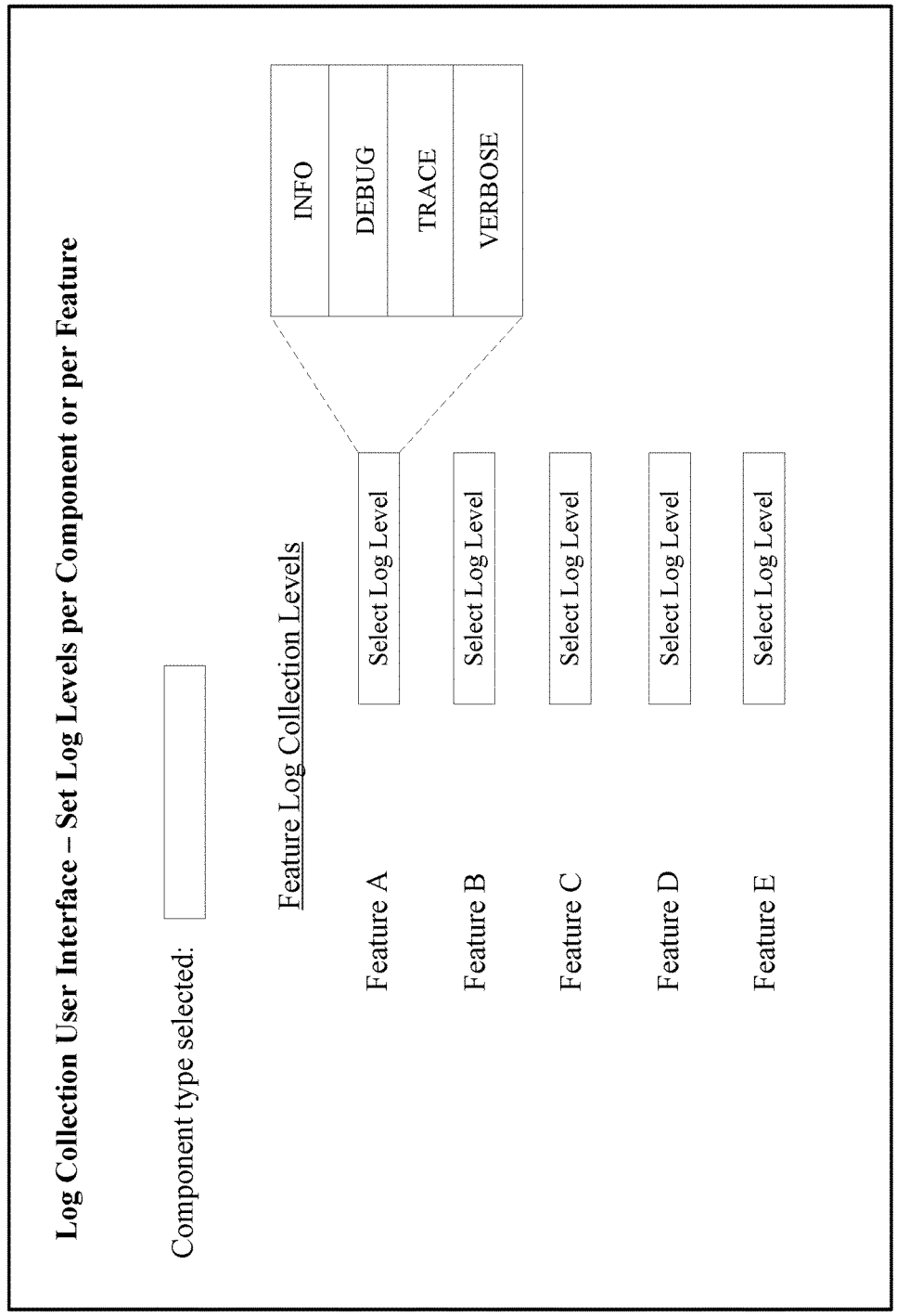
FIG. 3 depicts an example user interface (UI) for setting log levels for different remote experience features, according to an example embodiment of the present disclosure.

As an illustrative example, FIG. 3 depicts an example UI 300 for setting log levels for different features in the VDI environment, according to an example embodiment of the present disclosure. As shown in FIG. 3, example UI 300 may allow a user to select a component and set log levels for different features on that component. In certain aspects, a user may select a log level from four defined log levels, including, TRACE, DEBUG, INFO, and VERBOSE log levels. However, in certain other aspects, other log levels configured for the environment may be selected.

A user may set different and/or similar log levels for different features. For example, a user may select a DEBUG log level for both Feature A and Feature C or a user may select a DEBUG log level for Feature A and a VERBOSE log level for Feature C. For ease of explanation, it may be assumed that the user selects a DEBUG log level for both Feature A and Feature C. Accordingly, at operation 202 in FIG. 2, connection server 148 may receive the user's request to set a log level for Feature A and Feature C to the DEBUG log level.

At operation 204, the "set log level request" is transmitted from connection server 148 to one or more VDI agents 124. In particular, the "set log level request" transmitted at 204 may be transmitted to VDI agent 124 which includes Feature A and Feature C.

Log manager 152 at VDI agent 124 may receive the request and accordingly invoke DCT 154 to collect a configuration file for Feature A and a configuration file for feature C, at operation 206. As mentioned, each feature may have an associated configuration file having key-value mappings. The key-value mappings may normalize a feature's supported log level(s) to one or more defined log levels (e.g., INFO, DEBUG, TRACE, VERBOSE). The key is a defined log level for the VDI environment, and a value mapped to the key in each key-value mapping is a supported log level of the corresponding feature or component. For example, Feature A may only support two log levels "Default" and "DebugLog". Accordingly, the configuration file for Feature A may normalize these supported log levels to four log levels defined for the environment. For example, the "Default" supported log level for Feature A may map to the INFO log level, while the "DebugLog" may map to the DEBUG, TRACE, and VERBOSE log level. In other words, the configuration file for Feature A may include four key-value mappings of <INFO, Default> (e.g., where "INFO" is the key and "Default" is the value), <DEBUG, DebugLog>, <TRACE, Debuglog>, and <VERBOSE, Debuglog>.

Further, Feature C may support four log levels including "Info", "Debug", "Trace", and "Verbose". Accordingly, the configuration file for Feature C may also include four key-value mappings (e.g., of <Defined log level, Supported log level>); however, the key-value mappings included in the configuration file for Feature C may include <INFO, Info> (e.g., where "INFO" is the key and "Info" is the value), <DEBUG, Debug>, <TRACE, Trace>, and <VERBOSE, Verbose>.

Thus, Feature A and Feature C may have a same number of key-value mappings with similar keys (e.g., four key-value mappings for keys INFO, DEBUG, TRACE, and VERBOSE). Similar keys used in each configuration file may help to more easily set/change the log level for Feature A and Feature C (e.g., having different supported log levels) to the user requested log level for Feature A and Feature C.

In certain aspects, prior to setting the log level for each of Features A and C, at operation 208, VDI agent 124 may parse each feature's configuration file (e.g., all configuration files for all features on VDI agent 124), and more specifically, parse each feature's log level configuration to create a log level dependency map for features on VDI agent 124. The log level dependency map may identify associated features of Feature A and Feature C. Associated features returned for Feature A and Feature C may indicate other features on VDI agent 124. In certain aspects, associated features may be associated based on one or more dependencies, which may be indicated in one or more configuration settings. In certain aspects, associated features share the same log level setting (e.g., the same path and key). A feature which shares a same log level with another feature may need to have its log level changed (or set) when the log level of the other feature is changed (or set).

As an illustrative example, a log level setting in the configuration file for Feature A may be represented as:

```
{
  "featureName": "Feature A",
  "logLevelSettings": {
    "registries": [
      {
        "path": "path1",
        "key": "key1",
        ...
      },
      {
        "path": "path2",
        "key": "key2",
        ...
      }
    ]
  }
}
``` where "featureName" defines the feature name to be displayed to a user and "logLevel Settings" defines the log level settings for each feature. "registries" may be added in the configuration file where there are registry related settings. "path" may represent a path for a registry key and "key" may represent the key to set the log level.

A log level setting in a configuration file for another feature at VDI agent 124, Feature B (e.g., a non-requested feature), may be represented as:

```
{
  "featureName": "Feature B",
  "logLevelSettings": {
    "registries": [
      {
        "path": "path1",
        "key": "key1",
        ...
      }
    ]
  }
}
```

When parsing, at operation 208, the configuration file for Feature A and the configuration file for Feature B, VDI agent 124 may determine that Feature B is an associated feature of Feature A. VDI agent 124 may make this determination based on shared registry settings between Feature A and Feature B identified in the configuration files for Feature A and Feature B. For example, as shown above, registry settings for Feature A include path1 and key1, and similarly registry settings for Feature B include path1 and key1. Because of the overlap in both the path and key for each of these features, Feature A and Feature B are identified as having shared registry settings, thereby making Feature B an associated feature of Feature A. VDI agent 124 may record this relationship between Feature A and Feature B in a log level dependency map.

At operation 210, VDI agent 124 may set the log level for one or more features based on the "set log level request" transmitted at operation 204 and the log level dependency map created at operation 208. In this case, assuming only Feature A is determined to have an associated feature (e.g., Feature B), Feature C may be updated to the user requested log level setting for Feature C. For example, a log level setting for Feature C may be set to the requested DEBUG log level which is mapped to the "Debug" supported log level in the configuration file for Feature C.

Feature A may similarly be updated to the user requested log level setting for Feature A. For example, a log level setting for Feature A may be set to the requested DEBUG log level which is mapped to the "Debuglog" supported log level in the configuration file for Feature A. Because Feature B is determined to be an associated feature of Feature A (e.g., based on the log level dependency map), the log level for Feature B may also be set to the DEBUG log level (e.g., a supported log level mapped to the DEBUG log level).

At operation 212, VDI agent 124 provides connection server 148 with a "set log level response" indicating that the request has been completed (e.g., the requested log levels have been set). At operation 214, because Feature A has associated feature, Feature B, a warning dialog may be displayed to the user. The warning display may indicate other features, beyond those features requested by the user, for which a log level is set. The warning dialog may not be displayed when the requested features do not have associated features for which a log level also needs to be set. Though the warning dialog is displayed at operation 214 in FIG. 2 (e.g., after operation 212 where the log level for these additional associated features may be set), in some other embodiments, the warning display may be presented to a user prior to setting the log level for these associated features. In such a case, a user may select whether or not the log level may be set for these additional features before they are set by VDI agent 124.

FIG. 4 depicts an example UI 400 indicating the impact a change in one remote experience feature's log level has on other remote experience features in the VDI environment, according to an example embodiment of the present disclosure. UI 400 may be an example warning dialog presented to a user at operation 214 in FIG. 2.

As shown in FIG. 4, a Feature A may have associated features, Feature M, Feature N, Feature O, Feature P, and Feature Q. Accordingly, where the log level for Feature A is requested to be set/changed, a log level for each of Features M-Q may similarly be changed, such that log levels for Feature A and Features M-Q are the same. Either prior to, or subsequent to, making the log level changes for associated features, Features M-Q, example UI 400 may be presented to the user to warn the user about the impact that setting the log level for Feature A may have on the system.

Figure 5:
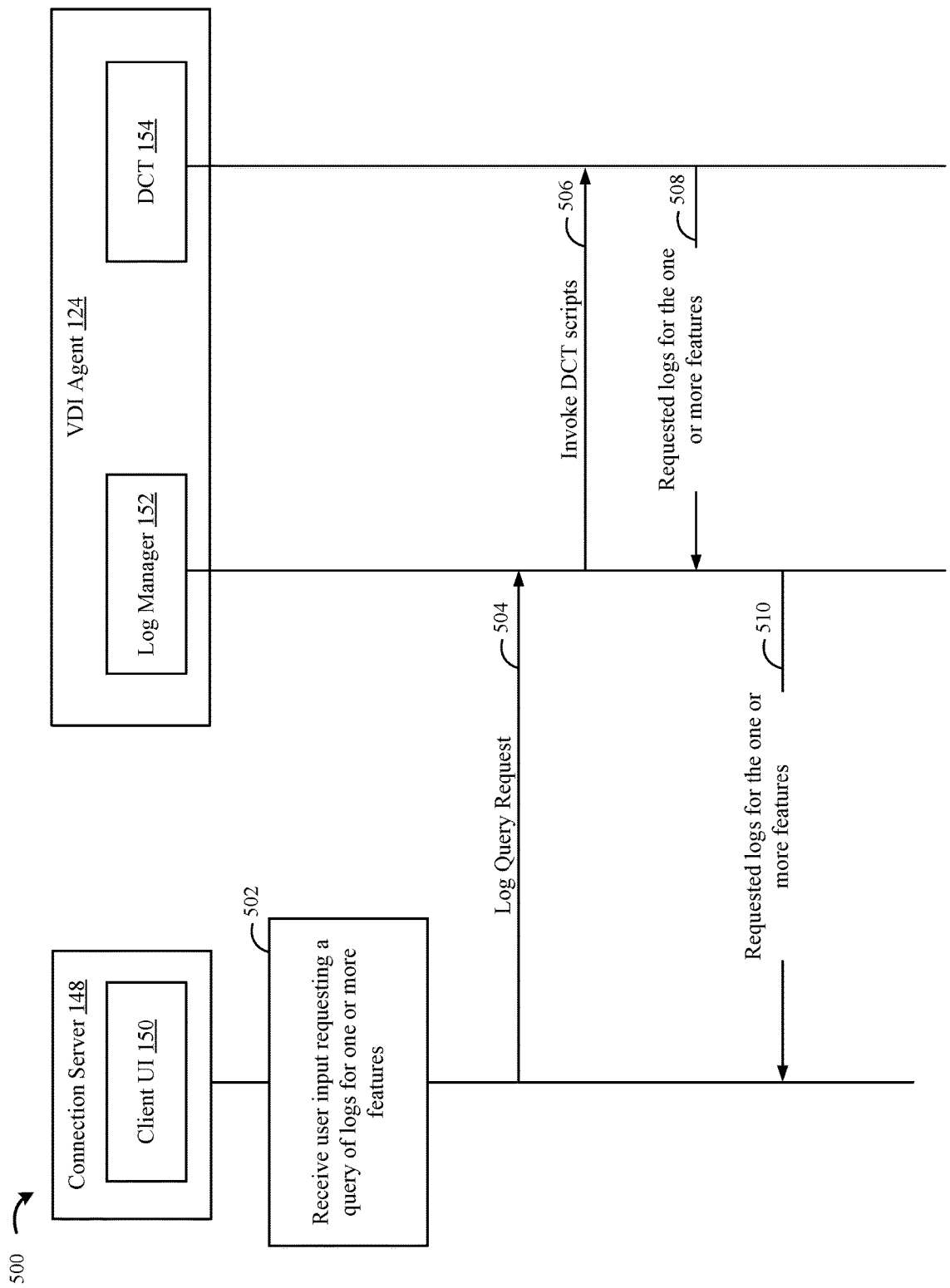
FIG. 5 is a call flow diagram illustrating example operations for querying logs for one or more remote experience features in the VDI environment, according to an example embodiment of the present disclosure.

As mentioned, in some other cases, a user may use client UI 150 at connection server 148 for collecting logs associated with one or more components or features in the VDI environment (as opposed to setting log levels for one or more components or features in the VDI environment as illustrated in FIG. 2). FIG. 5 is a call flow diagram illustrating example operations 500 for collecting logs for one or more features in the VDI environment, according to an example embodiment of the present disclosure. As shown, operations 500 illustrated in FIG. 5 may be performed by connection server 148, including client UI 150, and VDI agent 124, including log manager 152 and DCT 154, to query logs for one or more features, and more specifically, at least one feature on the illustrated VDI agent 124. Though FIG. 5 illustrates querying logs for one or more features, similar operations illustrated in FIG. 5 may also be used to query logs for one or more components in the VDI environment.

Similar to operations 200, operations 500 begin by a user (e.g., an administrator, a person seeking to troubleshoot one or more issues, a developer, etc.) accessing client UI 150, provided by connection server 148. However, instead of using client UI 150 to set log levels for one or more features as illustrated in FIG. 2, in FIG. 5, client UI 150 may be used to select features for log collection. Accordingly, at operation 502, client UI 150 may receive user input requesting to collect log levels for one or more features selected by the user. Logs may be collected for features on one or more multiple components in the VDI environment selected by the user on client UI 150.

Figure 6:
FIG. 6 depicts an example UI for selecting remote experience feature logs for collection, according to an example embodiment of the present disclosure.

As an illustrative example, FIG. 6 depicts an example UI 600 for selecting multiple features' logs to collect, according to an example embodiment of the present disclosure. As shown in FIG. 6, example UI 600 may allow a user to select a component and select different features on this component to identify which features' logs are to be collected. A user may choose to have logs collected for one, a subset, or all features of the component. This choice may be reflected by the features marked by the user in example UI 600. For example, in example UI 600, a user may indicate that logs are to be collected for Feature A, Feature C, and Feature E (e.g., denoted by the boxes with a check mark), without collecting logs for Feature B and Feature D (e.g., denoted by the boxes without a check mark).

In certain aspects, the request to collect logs for Features A, C, and E may be accompanied with a requested log level for each of these features. Accordingly, the log level for Features A, C, and E may need to have been previously set by VDI agent 124 to the requested log level (e.g., according to operations 200 illustrated in FIG. 2).

At operation 504, the "log query request" may be transmitted from connection server 148 to one or more VDI agents 124. In particular, the "log query request" transmitted at 204 may be transmitted to VDI agent 124 having Features A, C, and E.

Log manager 152 at VDI agent 124 may receive the request and accordingly, at operation 506, invoke DCT 154 to collect logs for Features A, C, and E (e.g., without collecting logs for other features on VDI agent 124). At operations 508 and 510, the requested logs for the one or more features, e.g., Features A-C, are transmitted from DCT 154 to log manager 152 of VDI agent 124, and from log manager 152 to client UI 150 on connection server 148 for use by the user. The user may analyze the requested logs for various reasons including, troubleshooting one or more issues at each of these features, searching for issues at each of these features, performing regular checks on each of these features, and/or the like.

Figure 7:
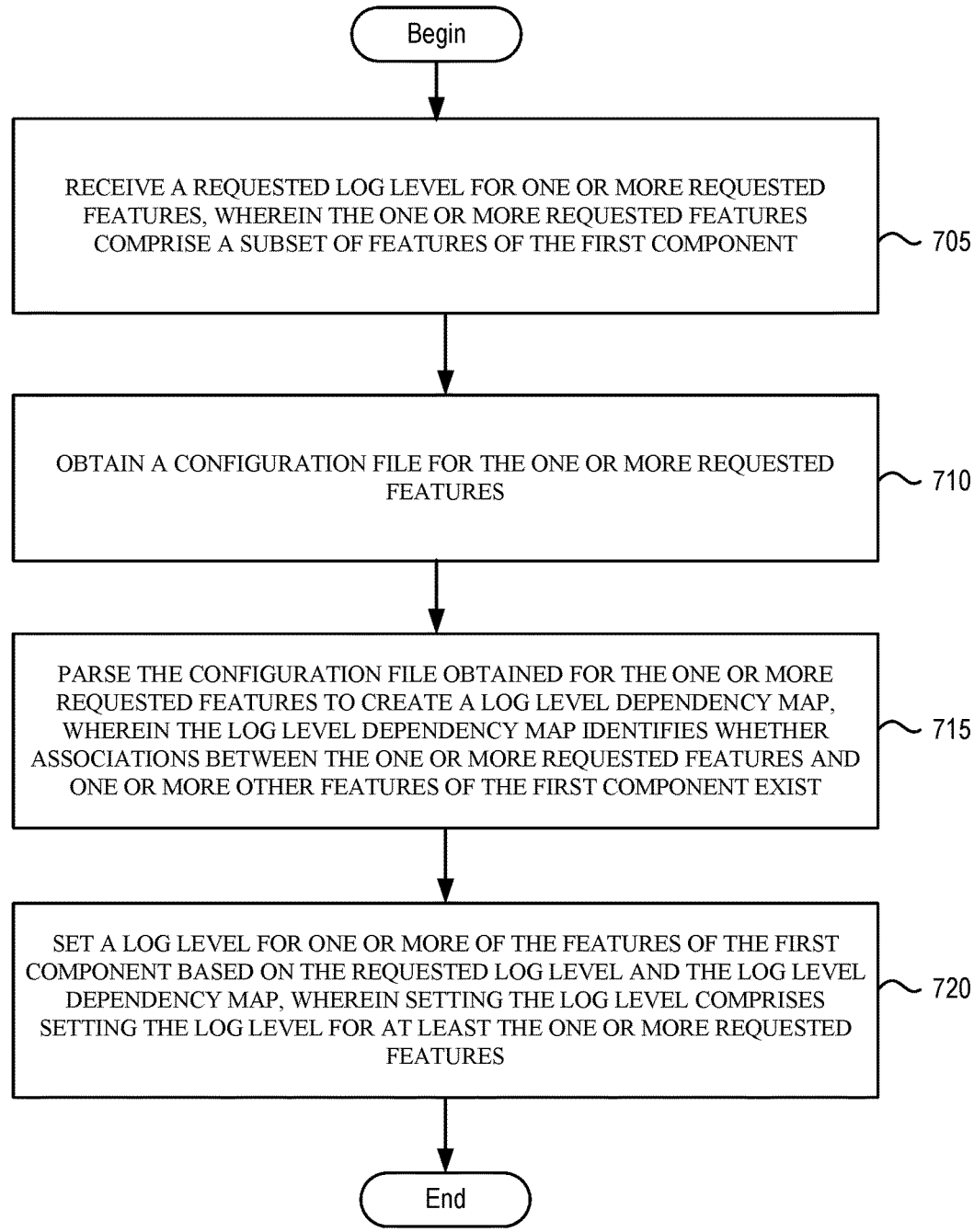
FIG. 7 depicts example operations related to log collection in a remote computing environment.

FIG. 7 depicts example operations 700 related to log level setting in a remote computing environment. In particular, operations 700 may be performed for log level setting at a first component in a remote computing environment. In certain aspects, operations 700 may be performed by VDI agent 124 illustrated in FIG. 1.

Operations 700 begin, at operation 705, by VDI agent 124 receiving a requested log level for one or more requested features, wherein the one or more requested features comprise a subset of features of the first component.

At operation 710, VDI agent 124 obtains a configuration file for the one or more requested features.

At operation 715, VDI agent 124 parses the configuration file obtained for the one or more requested features to create a log level dependency map, wherein the log level dependency map identifies whether associations between the one or more requested features and one or more other features of the first component exist.

At operation 720, VDI agent 124 sets a log level for one or more of the features of the first component based on the requested log level and the log level dependency map, wherein setting the log level comprises setting the log level for at least the one or more requested features.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for log level setting at a first component in a computing environment, the method comprising:
   receiving a requested log level for one or more requested features, wherein the one or more requested features comprise a subset of features of the first component;
   obtaining a configuration file for the one or more requested features;
   parsing the configuration file obtained for the one or more requested features to create a log level dependency map, wherein the log level dependency map identifies associations between the one or more requested features and one or more other features of the first component, wherein the one or more other features of the first component associated with the one or more requested features comprise a non-requested feature associated with at least one of the one or more requested features; and
   setting a log level for one or more of the features of the first component based on the requested log level and the log level dependency map, wherein setting the log level comprises setting the log level for at least the one or more requested features and setting the log level for the non-requested feature; and
   transmitting a message indicating the setting of the log level for the non-requested feature.

2. The method of claim 1, wherein the requested log level is a defined log level among multiple defined log levels configured for the computing environment.

3. The method of claim 2, wherein, for the one or more requested features, the corresponding configuration file comprises a mapping of one or more supported log levels to the multiple defined log levels.

4. The method of claim 2, wherein the log level for at least the one or more requested features is set based on the mapping.

5. The method of claim 1, further comprising:
   receiving a single request requesting to collect at least one of logs or dump files for the one or more requested features of the first component and at least one of a log or a dump file for another requested feature of a second component; and
   transmitting at least one of the logs or the dump files for the one or more requested features of the first component and at least one of the log or the dump file for the other feature of the second component to a requestor.

6. The method of claim 5, wherein the single request is received via a user interface.

7. The method of claim 1, further comprising:
   receiving a request to generate a real-time dump for the one or more requested features of the first component; and
   initiating the real-time dump in response to the request.

8. A system comprising:
   one or more processors; and
   at least one memory, the one or more processors and the at least one memory configured to cause the system to:
      receive a requested log level for one or more requested features, wherein the one or more requested features comprise a subset of features of a first component in a computing environment;
      obtain a configuration file for the one or more requested features;
      parse the configuration file obtained for the one or more requested features to create a log level dependency map, wherein the log level dependency map identifies associations between the one or more requested features and one or more other features of the first component, wherein the one or more other features of the first component associated with the one or more requested features comprise a non-requested feature associated with at least one of the one or more requested features; and
      set a log level for one or more of the features of the first component based on the requested log level and the log level dependency map, wherein setting the log level comprises setting the log level for at least the one or more requested features and setting the log level for the non-requested feature; and
      transmit a message indicating the setting of the log level for the non-requested feature.

9. The system of claim 8, wherein the requested log level is a defined log level among multiple defined log levels configured for the computing environment.

10. The system of claim 9, wherein, for the one or more requested features, the corresponding configuration file comprises a mapping of one or more supported log levels to the multiple defined log levels.

11. The system of claim 9, wherein the log level for at least the one or more requested features is set based on the mapping.

12. The system of claim 8, wherein the one or more processors and the at least one memory are further configured to cause the system to:
   receive a single request requesting to collect at least one of logs or dump files for the one or more requested features of the first component and at least one of a log or a dump file for another requested feature of a second component; and
   transmit at least one of the logs or the dump files for the one or more requested features of the first component and at least one of the log or the dump file for the other feature of the second component to a requestor.

13. The system of claim 12, wherein the single request is received via a user interface.

14. The system of claim 8, wherein the one or more processors and the at least one memory are further configured to cause the system to:
   receive a request to generate a real-time dump for the one or more requested features of the first component; and
   initiate the real-time dump in response to the request.

15. A non-transitory computer-readable medium comprising instructions that, when executed by one or more processors of a computing system, cause the computing system to perform operations for log level setting at a first component in a computing environment, the operations comprising:
   receiving a requested log level for one or more requested features, wherein the one or more requested features comprise a subset of features of the first component;
   obtaining a configuration file for the one or more requested features;
   parsing the configuration file obtained for the one or more requested features to create a log level dependency map, wherein the log level dependency map identifies associations between the one or more requested features and one or more other features of the first component, wherein the one or more other features of the first component associated with the one or more requested features comprise a non-requested feature associated with at least one of the one or more requested features; and
   setting a log level for one or more of the features of the first component based on the requested log level and the log level dependency map, wherein setting the log level comprises setting the log level for at least the one or more requested features and setting the log level for the non-requested feature; and transmitting a message indicating the setting of the log level for the non-requested feature.

\* \* \* \* \*